US006740386B2

(12) United States Patent  (10) Patent No.: US 6,740,386 B2
Hutchison  (45) Date of Patent: May 25, 2004

(54) TUFTED COVERING FOR FLOORS AND/OR WALLS

(75) Inventor: Robert D. Hutchison, Daleville, VA (US)

(73) Assignee: Burlington Industries, Inc., Greensboro, NC (US)

( * ) Notice: Subject to any disclaimer, the term of this patent is extended or adjusted under 35 U.S.C. 154(b) by 220 days.

(21) Appl. No.: 09/846,782

(22) Filed: May 2, 2001

(65) Prior Publication Data

US 2002/0164448 A1 Nov. 7, 2002

(51) Int. Cl.[7] .............................. B32B 3/02; B32B 3/26; B32B 5/02; D05C 15/00; D05C 17/00
(52) U.S. Cl. .............................. 428/88; 428/86; 428/89; 428/92; 428/95; 428/156; 428/172; 156/72
(58) Field of Search .............................. 428/86, 88, 89, 428/92, 95, 96, 156, 172; 156/72

(56) References Cited

U.S. PATENT DOCUMENTS

| 3,895,149 A | 7/1975 | Sheffler et al. |
| 4,064,816 A | 12/1977 | Spanel et al. |
| 4,411,666 A | 10/1983 | Hashizume et al. |
| 4,563,378 A | 1/1986 | Roth |
| 4,608,289 A | 8/1986 | McIntosh |
| 4,835,030 A | 5/1989 | Squier et al. |
| 4,988,551 A | 1/1991 | Zegler |
| 5,024,840 A | 6/1991 | Blakely et al. |
| 5,096,764 A | 3/1992 | Terry et al. |
| 5,217,783 A | 6/1993 | Roth |
| 5,383,415 A | 1/1995 | Padgett, III |
| RE34,951 E | 5/1995 | Slosberg et al. |
| 5,549,064 A | 8/1996 | Padgett, III |
| 5,560,307 A | 10/1996 | Padgett, III et al. |
| 5,560,972 A | 10/1996 | Blakely et al. |
| 5,605,107 A | 2/1997 | Padgett, III et al. |
| 5,612,113 A | 3/1997 | Irwin, Sr. |
| 6,162,748 A | 12/2000 | Schilling et al. |
| 6,344,254 B1 | 2/2002 | Smith et al. |

FOREIGN PATENT DOCUMENTS

| JP | 01-227715 | 3/1988 |
| WO | WO 90/00967 | 2/1990 |
| WO | WO 94/28225 | 12/1994 |
| WO | WO 98/38374 | 9/1998 |
| WO | WO 99/19557 | 4/1999 |
| WO | WO 99/55954 | 11/1999 |
| WO | WO 00/06853 | 2/2000 |

Primary Examiner—Cheryl A. Juska
(74) Attorney, Agent, or Firm—Nixon & Vanderhye P.C.

(57) ABSTRACT

A floor covering includes a primary backing having yarns tufted through the primary backing forming wear surface portions comprised of the back stitches of the tufted yarns in conjunction with non-tufted areas of the primary backing, also forming exposed wear surfaces. Both exposed wear surfaces portions form an aesthetic design pattern whereby a low, dense broadloom or modular carpet is provided at reduced materials and costs. Preferably, the primary backing is comprised of a woven polypropylene and a secondary backing is provided with the cut or loop yarns on the back side of the primary backing being fixed in place by a resin. A secondary backing formed of a composition of EVA, calcium carbonate and resin, overlaid by a woven scrim, is provided. The secondary backing may be formed of a needle-bonded synthetic fiber. Additionally, the primary backing may be formed of a non-woven material such as nylon and polyester.

38 Claims, 5 Drawing Sheets

TUFTED COVERING FOR FLOORS AND/OR WALLS

TECHNICAL FIELD

The present invention relates to coverings and particularly to tufted broadloom carpet and/or modular carpet, i.e., carpet tiles or roll tile wherein the wear surface of the covering includes exposed patterned portions of the primary backing and backstitches of the tufts having complementary aesthetic design characteristics.

BACKGROUND

One form of conventional covering is tufted broadloom roll carpet or modular carpet, i.e., carpet tiles or roll tile, hereafter generically referred to as carpet or covering. The terms carpet or covering are meant to embrace carpet applied to a floor, wall or ceiling. A principal and inherent deficiency in a carpet, particularly in commercial facilities, resides in the declining appearance retention of the aesthetic features of the carpet over long periods of use. For example, in commercial facilities, as well as in homes, carpet pile located adjacent doorways or high traffic areas quickly mats down with very noticeable adverse changes in appearance. Another example is conventional carpet used in locations where wheels and/or casters for chairs, carts and other items are frequently used. The appearance of the carpet in such areas degrades rapidly. It will be appreciated that carpet construction made to conventional levels typically sacrifices other desirable attributes such as comfort under foot or sound absorption and oftentimes a lack of aesthetic characteristics. Also, carpet which is over-engineered and over-designed to accommodate those high-use and high-traffic areas is concomitantly over-designed in areas of less traffic and use. For example, by designing a very high density carpet to accommodate high traffic areas by using additional pile, not only is the cost of the carpet substantially increased by the increased cost of the most expensive part of the carpet, i.e., the pile, but also waste disposal becomes a serious problem. Accordingly, there is a need for a carpet which overcomes the foregoing deficiencies and yet provides an aesthetically phasing appearance at low cost.

DISCLOSURE OF THE INVENTION

According to a preferred embodiment of the present invention, the burden of the wear surface of a tufted carpet constructed in accordance with the present invention is in part transferred to the primary backing surface which carpet pile normally obscures. The primary backing for a tufted pile carpet typically serves as a support for the pile rather than to impart any aesthetics to the carpet. In most carpets, the primary backing is totally obscured by the pile and plays no role in the aesthetic design of the carpet. In a preferred embodiment of the present invention, however, a tufted carpet is provided in which the backstitches of the tufts and exposed portions of the primary backing are presented as the wear surface. That is, both the backstitches of the tufts and primary backing portions in selected discrete areas of the carpet, respectively, are exposed as discrete parts of the wear surface. The exposed portions of the primary backing thus also form an aesthetic part of the carpet wear surface in conjunction with other portions of the wear surface of the carpet formed by the backstitches of the tufts exposed on one side of the primary backing. Because significant portions of the carpet wear surface comprise the exposed primary backing, the primary backing is not only provided with aesthetic considerations but is also formed with an ultraviolet stabilizer to alleviate the destructive effect of the sun's ultraviolet rays.

The preferred primary backing according to the invention is made of woven polypropylene tape yarns or multi-filament yarns, although other materials of construction, such as nylon or polyester or other polyolefins such as polyethylene may be used. Other yarn forms may also be used and other fabric forms, including warp knitted, weft insertion and non-woven or stitch-boiled may also be used.

The carpet hereof is thus characterized in part by the tight, dense and exposed backstitches of the tufts along portions of the wear surface of the primary backing in conjunction with portions of the primary backing which are likewise exposed as wear surfaces and which do not have any tufted yarns therethrough. It will be appreciated that the use of tufted yarns in only portions of the carpet and exposing the remaining portions of the primary backing, i.e., untufted areas, as part of the wear surface has the concomitant benefit of requiring less surface pile material, reduced costs and reduced disposal concerns at the end of the carpet's useful life. Moreover, the resulting carpet has a dense low-profile surface, which retains its textile aesthetics and enables rolling traffic such as beds, chairs, cleaning equipment and the like to move over the carpet without substantial degradation in the appearance of the carpet. The carpet is also much lighter than conventional tufted carpet.

To form the carpet hereof, a primary backing is tufted in a conventional manner and at selected areas along the primary backing. Rather than forming cut or continuous loops along the wear surface of the carpet, the tufted primary backing is inverted such that the backstitches of the tufts form portions of the wear surface. A resin is applied to the back side of the primary backing, which now contains either the cut or loop yarns to retain the cut or loop yarns in place on the back side of the primary backing. Thus, all of the cut or loop yarns on the back side of the primary backing are encapsulated by the resin. A hot melt composition is then applied over the resin. Preferably, the hot melt composition comprises a mixture of EVA, calcium carbonate and a resin, a mixture known in the trade as Unibond® backing. Additionally, while the hot melt is still in a liquid or plastic condition, a secondary backing, preferably a woven polypropylene scrim, is applied to the melt composition. The carpet construction is then moved across a chill table to solidify the Unibond® layer. Consequently, the woven polypropylene scrim forms the back side of the carpet which is then applied to the floor surface, for example, by an adhesive.

Instead of the secondary backing of woven polypropylene scrim, a needle-bonded synthetic fiber backing may be applied to the resin and Unibond® layer overlying the cut or loop yarn. The needle-bonded synthetic fiber is preferably a mixture of nylon and minor amounts of polypropylene, both of which are preferably recycled fibers from other manufacturing streams. Thus, the needle-bonded nylon and polypropylene fibers are homogenized and applied to the back side of the primary which is saturated with the resin fixing the cut or loop yarns in place. Of course, the needle-bonded nylon and polypropylene can be formed of original nylon and polypropylene without any waste content or mixtures of new and waste nylon and polypropylene fibers may be used. This type of secondary backing affords a dense coherent cushion fabric providing comfort underfoot, acoustic control and thermal insulation.

As a further alternative, and in lieu of the woven polypropylene primary backing, a non-woven primary backing, particularly useful for modular carpeting, may be provided. This primary backing may be formed of a mixture of nylon and polyester fibers, cut or chopped, mixed together and passed between a pair of heated rolls to form a flat sheet of the composite structure. The composite sheet may be tufted and provides a more dimensionally stable primary backing than woven polypropylene. This ensures carpet stability, particularly when used for modular carpets. While the non-woven primary backing may be used with either the Unibond® material and woven polypropylene scrim as a secondary backing or the needle-bonded synthetic fiber secondary backing, the non-woven backing is not essential or necessary for use in the manufacture of broadloom carpet. For modular carpeting, however, where high stability is required, the non-woven primary backing formed of the tufted sheet of nylon and polyester fibers may have a secondary backing, including a PVC precoat, to encapsulate the tufted fibers and maintain the tufted fibers in place. A main coat having a heavier PVC content and also a fiberglass stabilizer layer may be added for further stability.

In a preferred embodiment according to the present invention, there is provided a covering for a floor, wall or ceiling surface comprising a primary backing in part exposed on one side of the covering for forming discrete wear surface portions of a wear surface of the covering, a plurality of yarns tufted into the primary backing along remaining parts of the primary backing forming cut or loop yarns on a back side of the primary backing remote from the wear surface, leaving a plurality of backstitches of the tufted yarns along and forming remaining portions of the wear surface and a resin fixing the cut or loop pile tufted yarn along the back side or the primary backing, the backstitches and the primary backing portions exposed along the wear surface having aesthetic characteristics distinguished from one another.

In a further preferred embodiment according to the present invention, there is provided a covering for a floor, wall or ceiling surface comprising a woven primary backing having tufted and non-tufted portions on one side thereof exposed for forming discrete wear surface portions of a wear surface of the covering, the tufted portions including a plurality of yarns tufted into the primary backing and formed of cut or loop yarns on a back side of the primary backing remote from the wear surface, leaving a plurality of backstitches of the tufted yarns along and forming part of the wear surface and a resin fixing the cut or loop tufted yarns along the back side of the primary backing, the non-tufted portions comprising warp and weft yarns of the primary backing, the tufted and non-tufted portions of the primary backing exposed along the wear surface having aesthetic characteristics distinguished from one another. If desired, a protective coating may be applied to the wear surface side of the primary backing to enhance wear life.

BEST MODE FOR CARRYING OUT THE INVENTION

Figure 1:
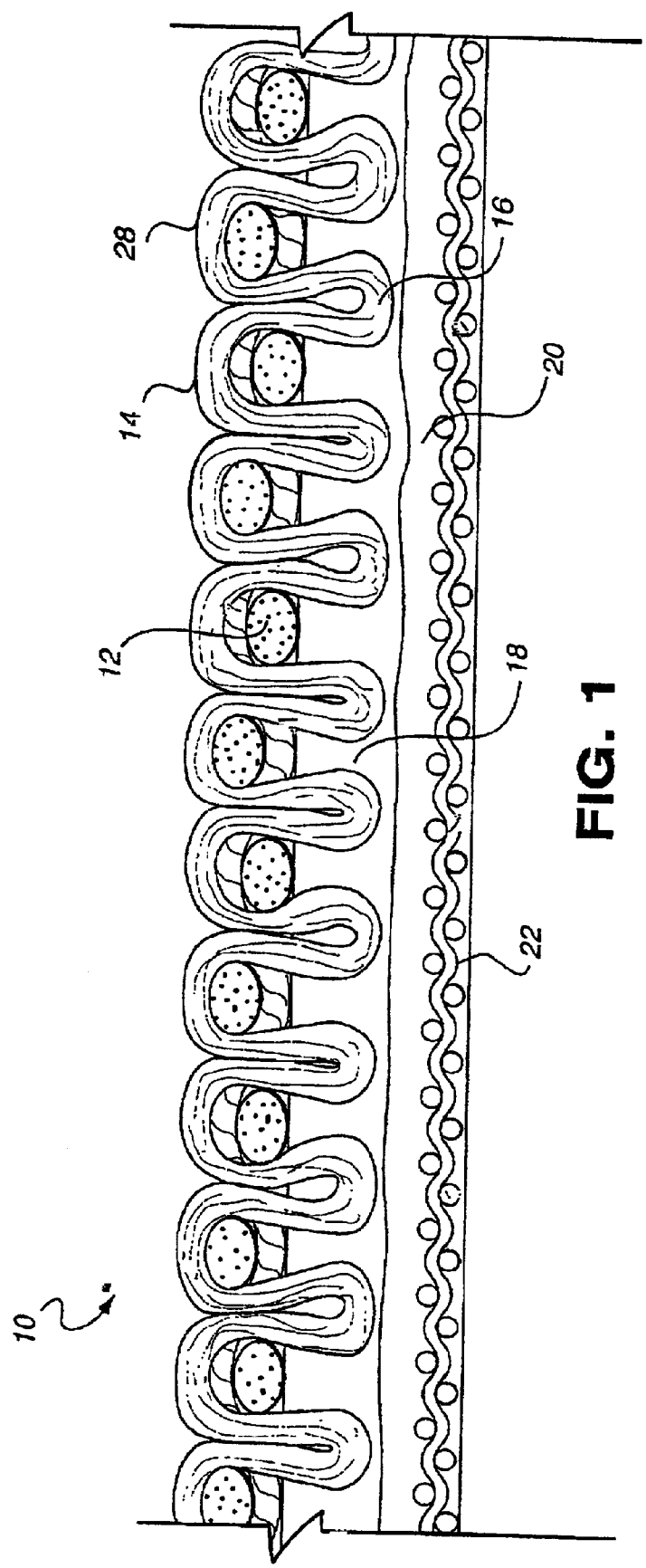
FIG. 1 is a schematic cross-sectional view of a covering constructed in accordance with a preferred embodiment of the present invention.

Referring now to the drawings, particularly to FIG. 1, there is illustrated a covering, generally designated 10, constructed in accordance with a preferred embodiment of the present invention. The covering 10 includes a woven polypropylene primary backing 12 which is tufted in a conventional manner by passing textured or untextured continuous filament or spun yarns 14 through the woven backing, forming looped yarns 16 along the underside of the primary backing 12. The tufting process is conventional and any type of fiber may be utilized for the yarn being tufted, for example, a polyester, polyolefin, polylactic acid or nylon, as desired. Moreover, while tufted continuous loop yarns 16 are illustrated on the back side of the primary backing 12, it will be appreciated that the loops or loop yarns 16 may comprise cut pile yarns along the back side of the primary backing 12. For reasons which will become clear, the woven primary backing also has an ultraviolet (UV) stabilizer to protect against the degrading effect of ultraviolet rays. That is, the primary backing is formed preferably of a woven polypropylene with a UV stabilizer added during extrusion of the polypropylene yarn forming the primary backing.

A resin 18 is applied along the back side of the primary backing and coats, encapsulates and saturates the loops 16 to lock the loop yarns in place. A Unibond® backing or coating is then applied over the resin-coated, continuous loop yarns 16. The Unibond® coating 20 comprises a mixture of ethylvinyl acetate (EVA), calcium carbonate and a resin. The Unibond® coating is applied as a hot melt composition over the resin 18. While the hot melt is still in a liquid or plastic condition, a secondary backing, preferably a woven polypropylene scrim 22, is applied to the Unibond® coating 20. The carpet construction is then passed over a chill table to set and solidify the Unibond® coating and secure the secondary backing 22 in the carpet construction. The secondary backing 22 provides integrity and dimensional stability to the covering.

From a review of FIG. 1, it will be appreciated that the backstitches 28 of the tufted yarns 14 are exposed through the primary backing 12 and form part of the wear surface. Moreover, each backstitch 28 is tufted tightly such that it is in substantial continuous contact with the woven polypropylene primary backing 12 for the entirety of its length exposed through the primary backing 12 on the wear surface.

Figure 4:
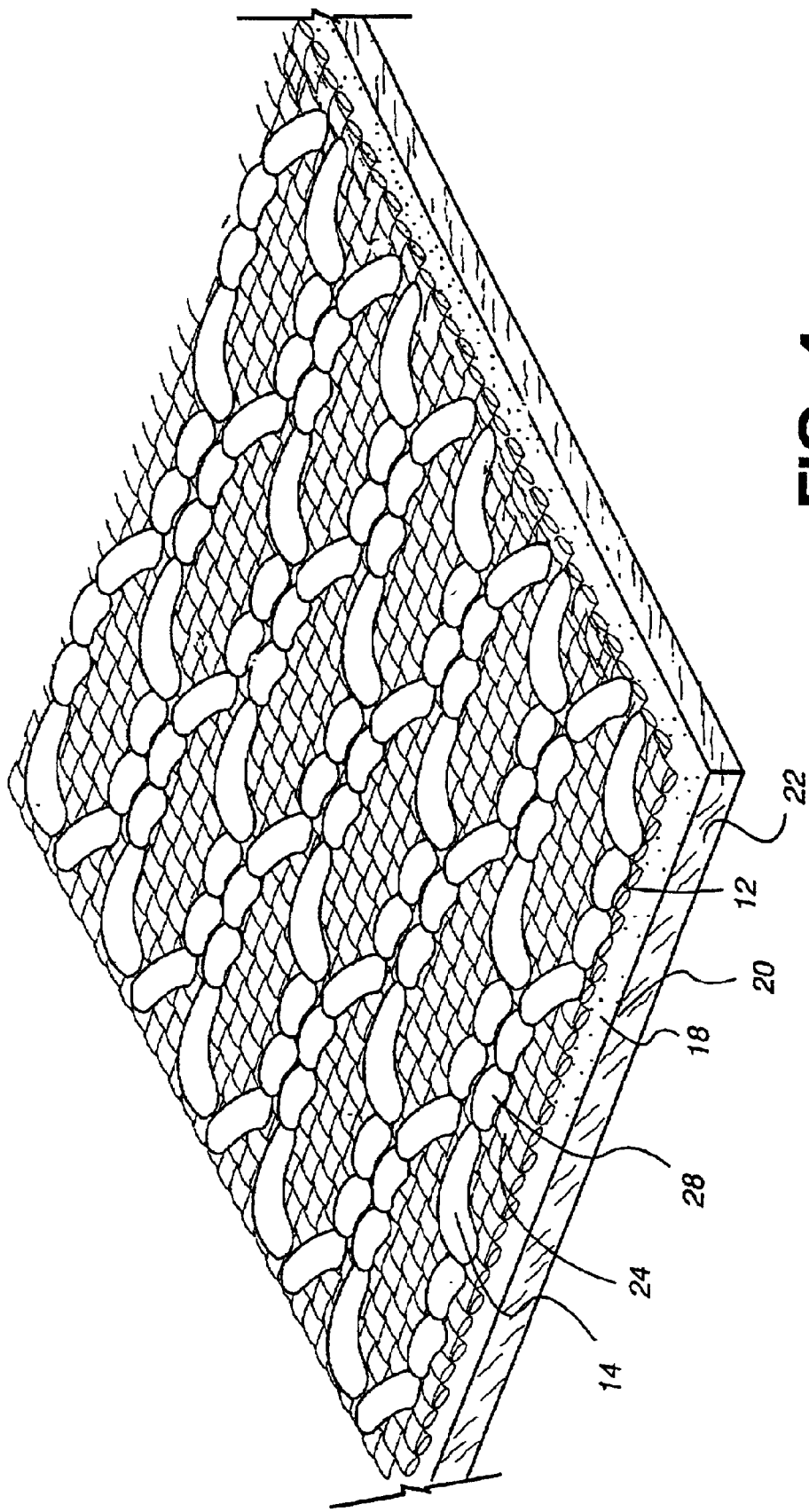
FIG. 4 is a perspective view illustrating the wear surface of a section of a covering constructed in accordance with the present invention.
Figure 5:
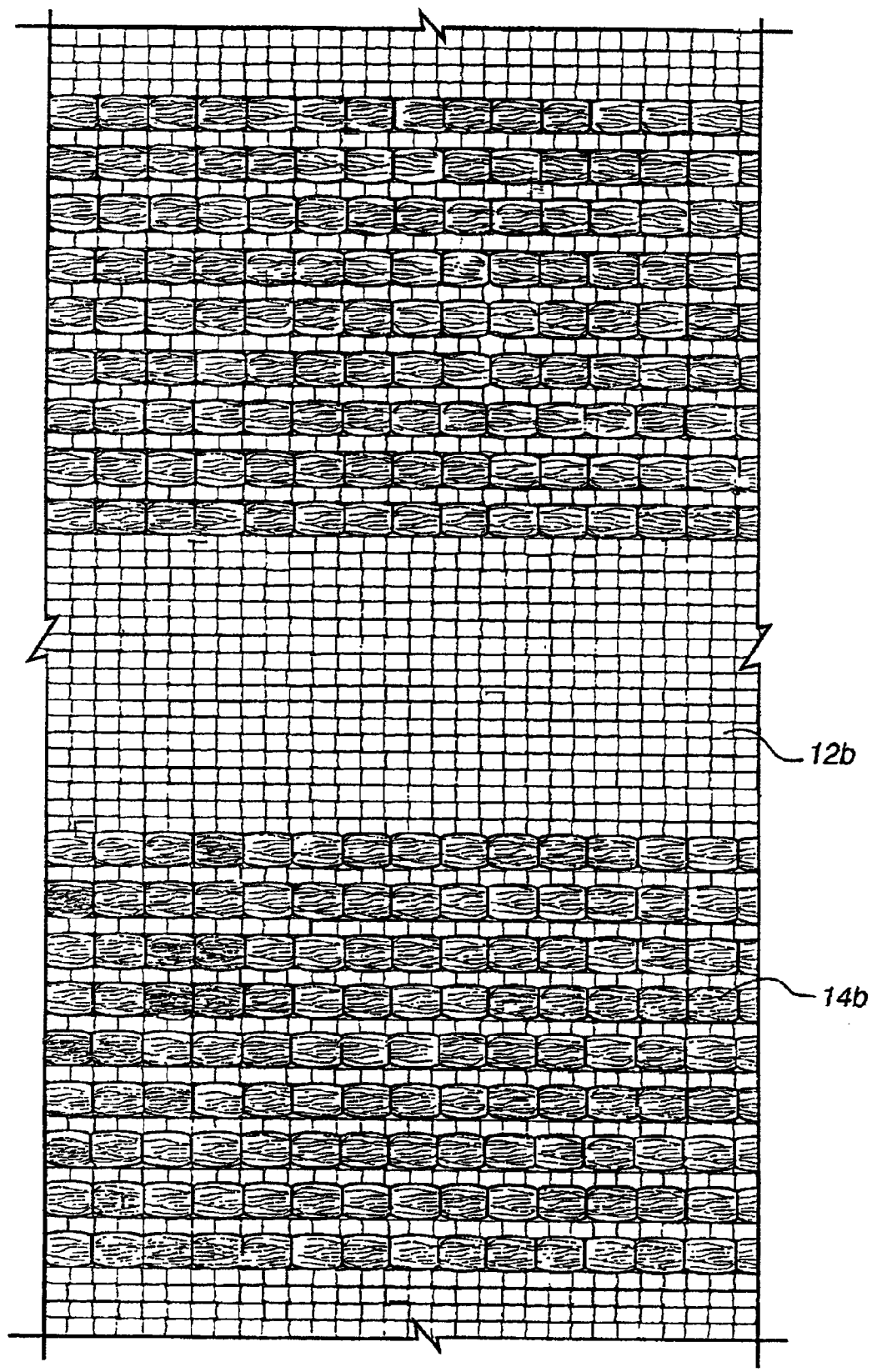
FIG. 5 is a plan view of another style of the covering hereof.

Referring now to FIGS. 4 and 5, there are illustrated two different styles of covering construction and which are considered representative of a multitude of different styles of covering according to the present invention. A principal aspect of the present invention resides in the use of the primary backing as part of the wear surface of the covering. In FIG. 4, the covering style illustrated comprises a diagonally extending pattern of hexagons formed by the tufted yarns 14. Portions 24 of the primary backing 12 lie exposed on and form part of the wear side of the covering. Backstitches 28 of the tufted yarns 14 form other or remaining parts of the wear surface of the covering. Thus, the non-tufted portions 24 of the primary backing 12 and the tufted portions of the yarns 14, e.g., the backstitches 28, form a complementary pattern along the wear surface of the covering. In this exemplary embodiment, the yarns 14 bound hexagonal areas of the primary backing 12 exposed as part of the wear surface. The tufted yarns 14 in this embodiment may comprise cut or continuous loop yarns. Because the primary backing portions 24 are exposed as part of the wear surface for the covering, the primary backing is exposed to ultraviolet rays. Accordingly, the fibers, film yarns or multifilaments forming the yarns of the primary backing, preferably polypropylene, are extruded with a UV stabilizer. This precludes degradation of the exposed portions of the primary backing due to sunlight.

It will be appreciated that the pattern of the covering illustrated in FIG. 4, i.e., a checkerboard pattern of non-tufted primary backing exposed as part of the wear surface and tufted primary backing with the backstitches exposed as part of the wear surface is illustrative only and that the present invention may be carried forward in a multitude of different styles and pattern constructions with a variety of aesthetic characteristics. For example, as illustrated in FIG. 5, the primary backing 12b contains a tufted pattern of rows of tufts 14b separated one from the other by rows of non-tufted primary backing, both exposed as the wear surface of the carpet. While many different patterns can be obtained by tufting portions of the primary backing and omitting tufting on other portions of the primary backing, it will be appreciated that the final result is a covering with portions of the primary backing exposed as part of the wear surface and portions of the primary backing containing yarns tufted into the primary backing with the backstitches of the tufted yarns forming the remaining part of the wear surface. The non-tufted primary backing portion thus forms part of the aesthetics of the covering in conjunction with the exposed backstitches of the tufted portions of the primary backing. Accordingly, the primary backing is preferably colored during its formation or thereafter by dyeing, to afford, in conjunction with preferably differently colored tufting yarns, a pleasing aesthetic appearance. It will also be appreciated that the textures of the wear surface of the covering are considerably different, considering that the non-tufted portions and the backstitches of the tufted portions of the primary backing both form discrete parts of the wear surface.

The appearance of the present covering is retained over a long period of usage. Instead of having exposed upstanding pile continuously worn down in high-traffic areas as in conventional tufted carpet, the wear surface of the present covering is provided by the backstitches, which are drawn tightly against the primary backing. Consequently, a very dense pile, with little capability for movement, is afforded. Moreover, with this construction, the textile characteristics of the covering, such as multiple colors and different textures, are retained.

To summarize the advantageous characteristics of the covering hereof, the backstitches of the tufted primary backing are presented as a part of the carpet wear surface, together with a carefully designed portion of the primary backing with each having a color, texture and pattern forming aesthetic design elements of the covering. The tight, dense backstitch is presented as a wear surface and is both attractive and functional. Secondly, the effect of the backstitches is to form a low pile. This has the concomitant benefit of requiring less material in the covering with reduced cost and disposal concerns at the end of the product's useful lifetime. Thirdly, the very dense and low-profile surface, while retaining its textile aesthetics, facilitates rolling traffic, with vastly less work expended in moving the traffic and greatly increases lifespan of the rolling traffic, as well as the covering. Additionally, substantial economies are effected in raw material costs in light of the reduced materials utilized in the covering thereof. Moreover, the covering is susceptible of a multitude of different patterns, affording many different colors and textures.

Figure 2:
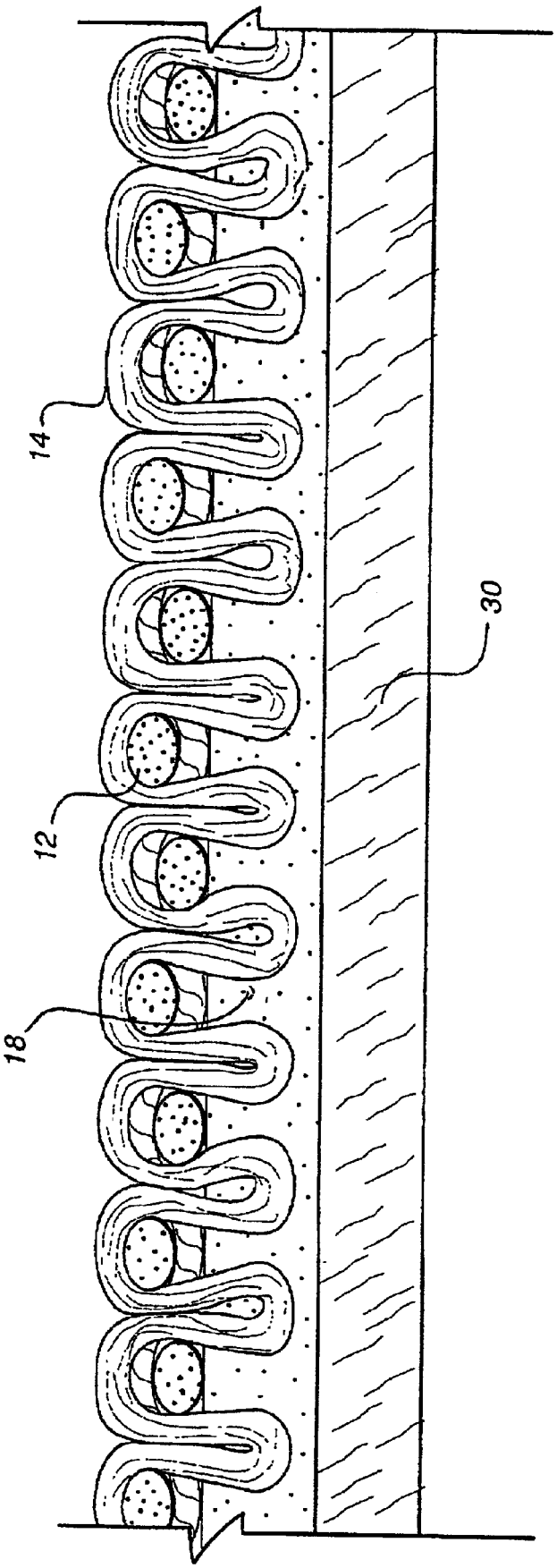
FIGS. 2 and 3 are views similar to FIG. 1 illustrating further embodiments of the present invention.

To provide an enhanced cushioning effect, and referring to FIG. 2, there is illustrated a woven primary backing 12 tufted with continuous loop yarns 14, which are coated on the underside by a resin 18, similarly as in FIG. 1. In this form, however, a needle-bonded synthetic fibrous and maincoat mat 30 underlies the resin coating 18. The needle-bonded synthetic fibers forming mat 30 may comprise nylon and polypropylene in a cut mixture thereof and mixed with a resin. Preferably, all, none or a proportion of the cut fibers may be formed from waste material from other carpet manufacturing streams.

Figure 3:
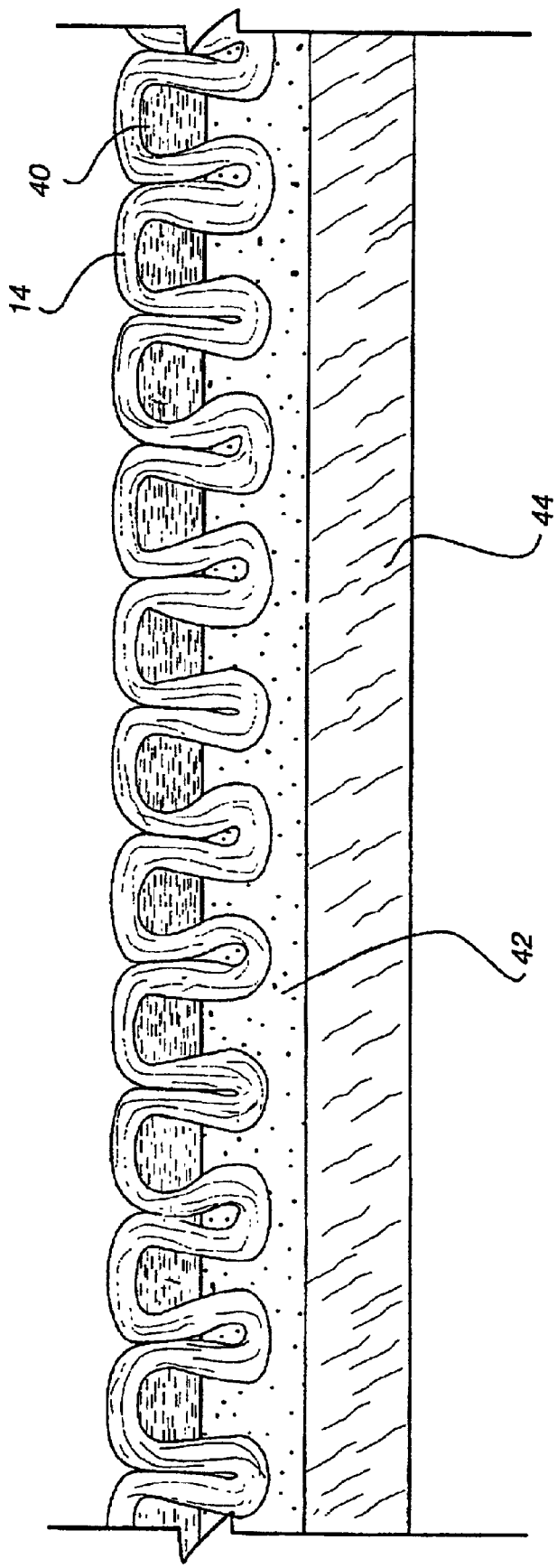

Referring now to FIG. 3, and in lieu of a woven polypropylene primary backing 12, there is provided a non-woven primary backing 40, particularly useful for modular carpeting, i.e., carpet tiles. The non-woven primary backing is preferably formed of a mixture of nylon and polyester fibers. Those fibers are reduced and mixed together and passed between heated rolls to flatten the fibers and form a composite flat sheet structure. The polyester fibers essentially bond the nylon fibers to one another. This sheet may then be tufted, with either the cut or continuous loop yarns 14, to form a highly dimensionally stable primary backing.

While it is possible to provide the non-woven primary backing with either the Unibond® material and the woven scrim as a secondary backing or the needle-bonded synthetic fiber backing, the non-woven backing is not necessary for broadloom carpeting. Preferably, and for use in modular carpeting, a PVC backing is provided to the non-woven primary backing. Particularly, a PVC precoat 42 is applied to the tufted yarn loops 14 to trap and lock the loops in place along the underside of the non-woven primary backing 40. A main coat 44 of heavier PVC is then applied, together with a fiberglass stabilizer layer for additional stability.

It will be appreciated that in all of the foregoing constructions, the wear surface of the covering comprises non-tufted exposed primary backing and exposed backstitches of tufted yarns formed in an aesthetically pleasing pattern of low, dense fibers where the exposed, non-tufted primary backing forms part of the aesthetic design element for the wear surface. It will also be appreciated that a fabric constructed as described above, but modified, can be used as wall or ceiling covering. The modification would be effected by substituting a compound containing a flame retardant as a backing material in place of the Unibond® backing described above. These types of backing compounds are commonly available. No secondary backing is mandated in this case.

While the invention has been described in connection with what is presently considered to be the most practical and preferred embodiment, it is to be understood that the invention is not to be limited to the disclosed embodiment but on the contrary, is intended to cover various modifications and equivalent arrangements included within the spirit and scope of the appended claims.

What is claimed is:

1. A covering for a floor, wall or ceiling surface comprising:
    a primary backing having discrete parts thereof exposed on one side of the covering for forming discrete wear surface portions of a wear surface of the covering;
    a plurality of yarns tufted into said primary backing along remaining parts of said primary backing forming cut or loop yarns on a back side of said primary backing remote from said wear surface, leaving a plurality of backstitches of the tufted yarns along and forming discrete remaining wear surface portions of said wear surface; and
    a resin fixing said cut or loop tufted yarns along the back side of said primary backing;
    said discrete remaining wear surface portions formed by said backstitches and said discrete parts of said primary backing exposed along said wear surface having aesthetic characteristics distinguished from one another.

2. A covering according to claim 1 wherein said primary backing is formed of a woven material having an ultraviolet stabilizer.

3. A covering according to claim 1 wherein each said backstitch extends between a pair of needled openings along the wear surface extending along and in engagement with the primary backing throughout substantially the entirety of the extent of the backstitch between said openings.

4. A covering according to claim 1 wherein said backstitches and said discrete parts of said primary backing have different colorings to afford different aesthetic effects.

5. A covering according to claim 1 including an EVA and calcium carbonate layer underlying the resin.

6. A covering according to claim 5 including a secondary backing comprising a scrim embedded in the EVA and calcium carbonate layer.

7. A covering according to claim 6 wherein said scrim comprises a woven polypropylene.

8. A covering according to claim 1 wherein the tufted yarns are of a continuous loop pile construction.

9. A covering according to claim 1 wherein the tufted yarns are of a cut loop pile construction.

10. A covering according to claim 1 wherein said primary backing is formed of a woven material having an ultraviolet stabilizer, said backstitches and primary backing parts having different colorings to afford different aesthetic effects, an EVA and calcium carbonate layer underlying the resin and a secondary backing comprising a scrim embedded in the EVA and calcium carbonate layer.

11. A covering according to claim 10 wherein said scrim comprises a woven polypropylene, and wherein the tufted yarns are of a continuous loop construction.

12. A covering according to claim 10 wherein said scrim comprises a woven polypropylene, and wherein the tufted yarns are of a cut loop construction.

13. A covering according to claim 1 including a secondary backing underlying said resin and secured to said primary backing by said resin, said secondary backing including a needle-bonded synthetic fiber backing.

14. A covering according to claim 13 wherein said secondary backing includes fibers formed of nylon and polypropylene.

15. A covering according to claim 1 wherein said primary backing comprises a non-woven material formed of synthetic fibers.

16. A covering according to claim 15 wherein said non-woven fiber materials comprise nylon and polyester bonded to one another.

17. A covering according to claim 15 wherein said resin comprises a precoat of polyvinylchloride to fix the cut or loop yarns and a main polyvinylchloride coating having a fiberglass stabilizer underlying the precoat.

18. A covering according to claim 1 wherein the covering comprises broadloom carpeting.

19. A covering according to claim 1 wherein the covering comprises modular carpeting.

20. A covering according to claim 1 wherein each of said discrete wear surface portions of said primary backing includes an area thereof void of tufted yarns.

21. A covering according to claim 20 wherein the wear surface portion of said area void of tufted yarns is exposed at an elevation above any other material in said covering forming part of said area.

22. A covering for a floor, wall or ceiling surface comprising:
   a woven primary backing having tufted and non-tufted portions on one side thereof exposed for forming discrete respective wear surface portions of a wear surface of the covering;
   said tufted portions including a plurality of yarns tufted into said primary backing and formed of cut or loop yarns on a back side of said primary backing remote from said wear surface, leaving a plurality of backstitches of the tufted yarns along and forming one of said wear surface portions of said wear surface; and
   a resin fixing said cut or loop tufted yarns along the back side of said primary backing;
   said non-tufted portions comprising warp and weft yarns of said primary backing and forming another of said wear surface portions of said wear surface;
   said tufted and non-tufted portions of said primary backing exposed along said wear surface having aesthetic characteristics distinguished from one another.

23. A covering according to claim 22 wherein each of said discrete wear surface portions of said primary backing includes an area thereof void of tufted yarns.

24. A covering according to claim 23 wherein the wear surface portion of said area void of tufted yarns is exposed at an elevation above any other material in said covering forming part of said area.

25. A method of forming a covering for a floor, wall or ceiling surface comprising the steps of:
   (a) providing yarns and a primary backing formed of materials having aesthetic characteristics distinguished from one another;
   (b) tufting a plurality of said yarns into and along selected portions of said primary backing forming cut or loop yarns on a back side of primary backing portions remote from a wear surface of the covering leaving a plurality of backstitches of the tufted yarns along and forming discrete portions of said wear surface and exposing non-tufted remaining portions of the primary backing to respectively form remaining discrete portions of the wear surface; and
   (c) applying a resin along the back side of said primary backing to fix said cut or loop pile tufted yarn;
   thereby to form a covering with discrete wear surfaces formed by the backstitches of the tufted yarns and exposed portions of the primary backing, respectively.

26. A method according to claim 25 including forming said primary backing of a woven material having an ultraviolet stabilizer.

27. A method according to claim 25 including providing the tufting yarns and primary backing in different colorings to afford different aesthetic characteristics.

28. A method according to claim 25 including applying an EVA and calcium carbonate layer to underlie the resin.

29. A method according to claim 28 including providing a secondary backing by embedding a scrim in the EVA and calcium carbonate layer.

30. A method according to claim 25 including forming the tufted yarns in a continuous loop pile construction.

31. A method according to claim 25 including forming the tufted yarns in a cut loop pile construction.

32. A method according to claim 25 including forming said primary backing of a woven material having an ultraviolet stabilizer, providing the tufting yarns and primary backing in different colorings to afford different aesthetic characteristics, applying an EVA and calcium carbonate layer to underlie the resin, and providing a secondary backing by embedding a scrim in the EVA and calcium carbonate layer.

33. A method according to claim 25 including forming a needle-bonded synthetic secondary backing and securing said secondary backing to said primary backing by said resin.

34. A method according to claim 25 including forming said primary backing of a non-woven material of synthetic fibers, fixing the cut or loop yarns by providing a precoat of polyvinylchloride to the back side of the primary backing and providing a main polyvinylchloride coating having a fiberglass stabilizer to the precoat.

35. A method according to claim 25 including forming the covering into broadloom carpeting.

36. A method according to claim 25 including forming the covering into modular carpeting.

37. A method according to claim 25 including forming each of said discrete wear surface portions of said primary backing to include an area thereof void of tufted yarns.

38. A method according to claim 37 including forming the wear surface portion of each said area of said primary backing at an elevation above any other material in said covering forming part of said area.

* * * * *